United States Patent [19]

Hill

[11] 4,322,167
[45] Mar. 30, 1982

[54] METHOD FOR MAKING ASPHALT-RUBBER PAVEMENT COMPOSITIONS

[76] Inventor: Francis K. Hill, P.O. Box 2059, Wickenburg, Ariz. 85358

[21] Appl. No.: 121,422

[22] Filed: Feb. 14, 1980

[51] Int. Cl.³ .................... B28C 7/06; B28C 7/12
[52] U.S. Cl. ............................ 366/8; 366/14; 366/19; 366/27; 366/34; 366/37; 366/51
[58] Field of Search ........... 366/3, 6, 8, 10, 13–17, 366/19, 20, 27–30, 34, 37, 51; 406/82, 99, 173

[56] References Cited

U.S. PATENT DOCUMENTS

| 881,940 | 3/1908 | Morton | 406/82 |
| 1,613,682 | 1/1927 | Tuttle | 366/15 |
| 3,451,659 | 6/1969 | Tobolou et al. | 366/27 |
| 3,610,588 | 10/1971 | Diefenbach | 366/24 |
| 3,625,724 | 12/1971 | Alvero | 366/10 X |
| 3,682,448 | 8/1972 | Kedzior et al. | 366/6 |

FOREIGN PATENT DOCUMENTS

| 7712041 | 5/1979 | Netherlands | 366/19 |
| 880481 | 10/1961 | United Kingdom | 406/173 |

Primary Examiner—Philip R. Coe
Attorney, Agent, or Firm—Herbert E. Haynes, Jr.

[57] ABSTRACT

A method and apparatus for mixing molten asphalt and granulated rubber including an asphalt input system and a rubber input system for delivering the molten asphalt and the granulated rubber in accordance with predetermined mixture proportions to a two-stage mixing system which mixes those materials to form a consistantly formululated thoroughly blended asphalt-rubber composition.

4 Claims, 11 Drawing Figures

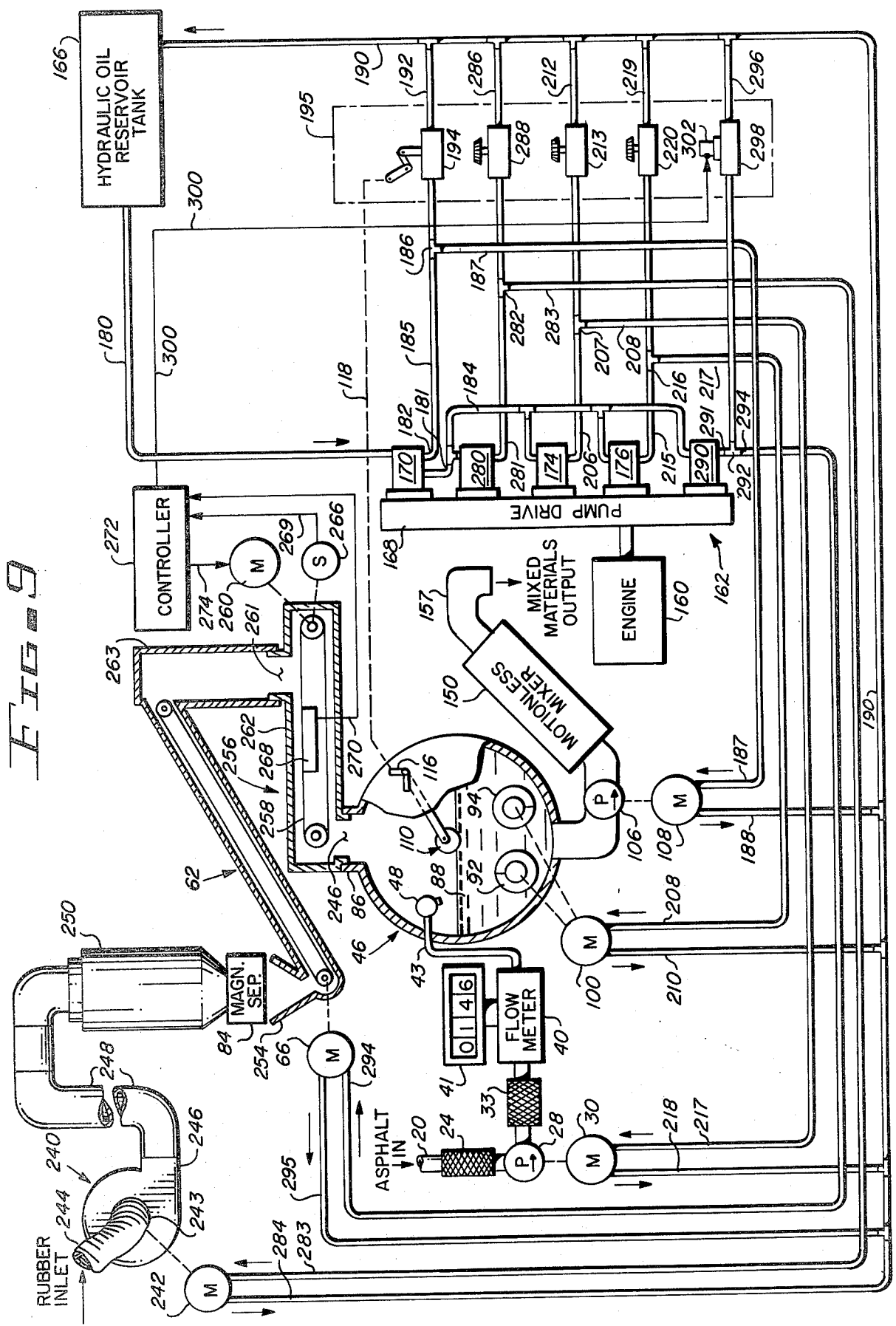

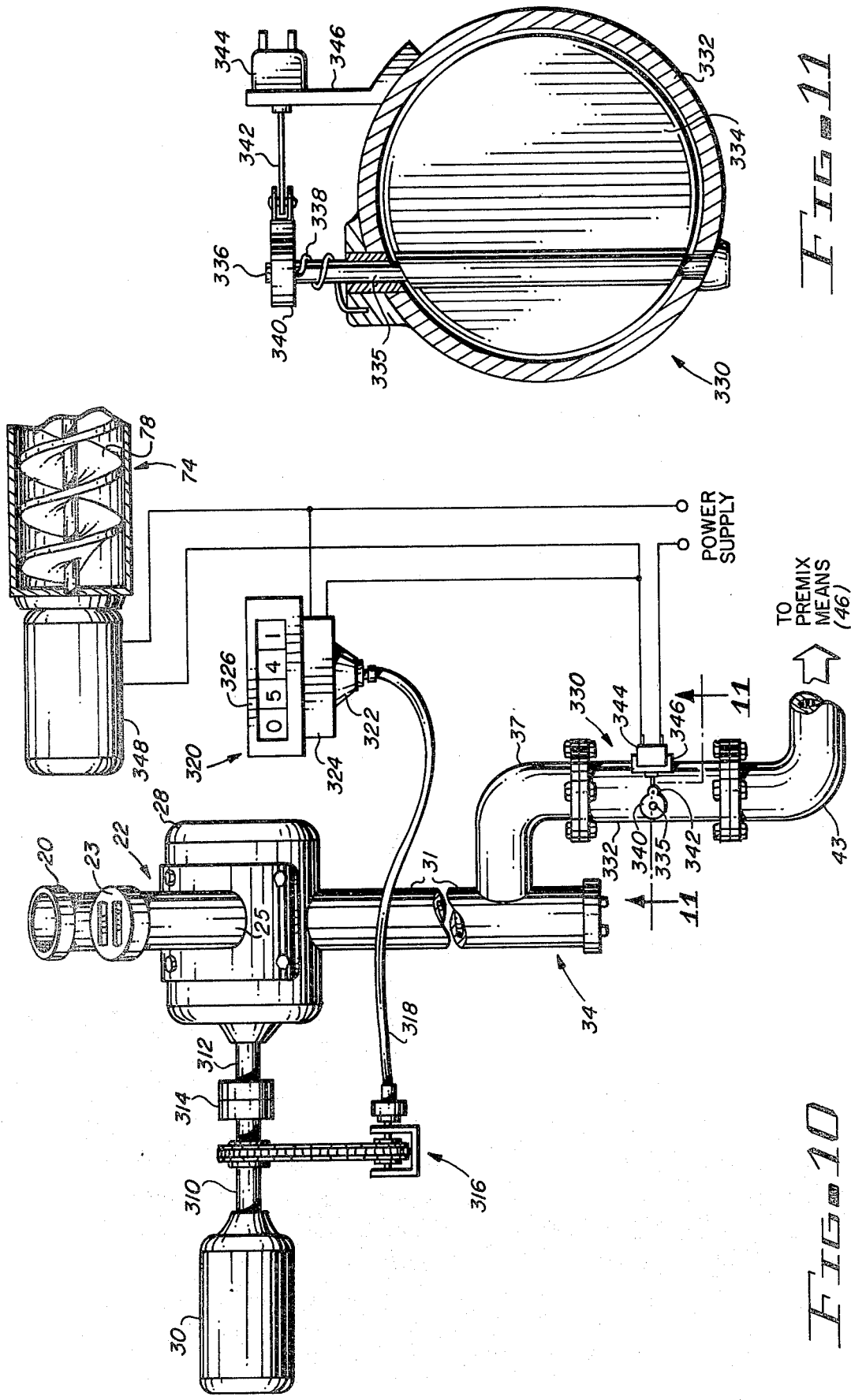

METHOD FOR MAKING ASPHALT-RUBBER PAVEMENT COMPOSITIONS

BACKGROUND OF THE INVENTION

1. Field of the Invention

This invention relates generally to paving materials and more particularly to an apparatus and method for mixing asphalt and rubber to form an asphalt-rubber pavement surfacing and repairing composition.

2. Description of the Prior Art

The increased volume of traffic along with general aging has caused severe problems on many roadways, streets, and other paved surfaces in this country. A particular problem results from elastic type failures in pavements which causes cracking patterns of the type sometimes referred to as an "alligator" cracking pattern. This type of elastic failure is caused by fatigue of the pavement surface resulting from repeated deflections. Other problems of concern are random cracking of paved surfaces due primarily from expansion and contraction, and the general aging of the sealing materials in expansion joints. All of these types of pavement failures must be repaired to prevent water and/or uncompressible materials from entering into the cracks or joints. If water enters into such cracks or joints it can either wash out the base materials, or cause a general breaking up of the pavement due to freezing. If uncompressible materials, such as sand, enter into the cracks or joints it will severely restrict expansion of the pavement and again result in a general breaking up of the pavement surface.

Considerable experimentation has been conducted in recent times to provide relatively low cost repair techniques, and of particular interest is an asphalt-rubber composition which has proven to be a very satisfactory material for use as a seal coating, for filling and sealing random cracks, as a replacement for deteriorated materials in expansion joints, and the like.

Briefly, the asphalt-rubber composition is a reaction product which is neither asphalt nor rubber in nature but is an elastomeric sealing compound. The asphalt-rubber composition includes a mixture of paving grade asphalt and granulated crumb rubber of the non-oil resistant asphalt-soluble type, which are prepared and mixed in conformity to a specific method and mixture proportions. The asphalt is heated to a range of between 350° F. to 500° F. and the granulated rubber is added thereto, and mixed together. Although the mix proportions may vary somewhat, it has been found that mix proportions of between 2 to 3 parts of asphalt and one part of rubber are satisfactory and that a mix proportion of 75% plus or minus 2% of asphalt by weight and 25% plus or minus 2% of rubber provides the ideal composition which possesses an ideal balance between the sealing characteristics of the asphalt and the elasticity of the rubber. This particular asphalt-rubber composition is fully disclosed in U.S. Pat. No. 3,891,585 issued on June 24, 1975 to Charles H. McDonald.

Although the asphalt-rubber composition is an excellent material, its more widespread usage has been held back by problems with handling and mixing of the asphalt and rubber materials.

The asphalt material is normally delivered in bulk form, such as in tank cars, to the mixing site and other than some occassional and relatively minor contamination, will not pose any problems in addition to the well known and expected difficulties associated with the handling of such material.

The rubber generally used for this purpose is obtained from a supplier who grinds up old automobile tires and packages the granulated crumb rubber in bags of predetermined weight for shipment to the mixing site. The rubber supplier is responsible for removing all metal and other contaminants from the rubber, and for the most part does a pretty good job. However, some metal, primarily from ground up steel belted radial tires, will be found in the granulated rubber, and when this occurs, the useful life of pumps and other equipment used in the handling and application of the asphalt-rubber composition will be severely shortened.

Although the above described contamination of the asphalt and rubber materials can be detrimental to the finished product and the handling equipment, the inherent characteristics of those materials pose the biggest problem, in that it is very difficult to mix those materials and produce a consistently blended mixture of the proper proportions. The granulated rubber is a somewhat cohesive material and as such will often form clods that block supply conduits, applicator devices and the like. In addition, the rubber has a tendency to float and avoid mixing with the asphalt.

In general, the prior art practice for mixing the asphalt and rubber materials includes pumping the molten asphalt (350° F.–500° F.) through a suitable flow meter into a mixing tank and manually adding an appropriate number of bags of granulated rubber. The flow meter is used to control the amount of asphalt that is pumped into the mixing tank, and the amount of rubber is controlled by counting the number of pre-weighed bags of rubber that are added to the tank. Although this method of determining the mix proportions is rather crude, if carefully done, the results can be quite satisfactory. However, the packaging, handling, weighing, and particularly shipping of the individual bags of granulated rubber is very costly and time consuming, but is indispensable as far as the prior art technique of mixing is concerned, in that the individual bags of predetermined weight are relied upon for controlling the mix proportions.

The prior art mixing tanks, although varying somewhat in configuration, are all basically the same. Briefly, the mixing tanks are elongated horizontally disposed structures with some sort of an agitation device such as an auger arrangement which extends longitudinally through the bottom of the tank. The asphalt and rubber materials are introduced into the mixing tank through suitable ports and conduits located at the top thereof, and the mixed asphalt-rubber composition exits the tank by means of a pump and conduit arrangement located at the bottom of the tank. A typical prior art mixing structure of the above described type is fully shown and described in U.S. Pat. No. 3,610,588 issued on Oct. 5, 1971 to G. W. Diefenbach.

The above described prior art practice and mixing mechanisms have proven less than satisfactory for several reasons. First, the prior art makes no provisions for ridding the asphalt and granulated rubber of contaminants. Secondly, the manual introduction of the granulated rubber into the mixing tank is of course, subject to human error and improper formulation of the asphalt-rubber composition can occur. Thirdly, the prior art mixing apparatus will not always break up the lumps or clods of granulated rubber and this can cause plugging of the conduits and applicator devices. The fourth, and most troublesome problem with the prior art method and the apparatus, is that the produced asphalt-rubber composition is not always a consistently blended mixture of the proper mix proportions.

As previously mentioned, the granulated rubber has a tendency to float and avoid mixing with the molten asphalt, and therefore, the upper portion of the materials within the tank will have a somewhat larger concentration of rubber than the materials in the lower part of the tanks. During draining the mixture having a lower rubber concentration will be pumped out faster and easier than that having a high concentration of rubber. Since the asphalt-rubber composition is pumped out of the bottom of the mixing tank, the floating rubber will coat the interior of the tank, and the residual composition remaining in the tank after draining, will have a high rubber concentration. It is very rare for a mixing tank to be used for mixing a single batch of the asphalt-rubber composition in that production and/or job requirements most often require very large quantities of the composition.

The above described coating of the tank and residual concentrations will have a cumulative effect and it has been estimated that rubber concentrations will reach between 30% and 35% near the end of a day's continuous mixing tank usage, and this, of course, can cause serious problems with the integrity of the asphalt-rubber composition.

Therefore, a need exists for a new and improved method and apparatus for mixing an asphalt-rubber composition which overcomes some of the problems and shortcomings of the prior art.

SUMMARY OF THE INVENTION

In accordance with the present invention, a new and improved apparatus and method for mixing an asphalt-rubber composition is disclosed.

The apparatus includes an asphalt input system for supplying molten asphalt at a known and variable rate, a granulated rubber input system for supplying the rubber at a consistent and known rate, and a two-stage mixing system for complete and consistent blending of the asphalt-rubber composition.

The molten asphalt input system includes strainer means for removing contaminants from the asphalt, a variable speed positive displacement pump and asphalt flow sensing means for supplying the asphalt at a known and variable rate, and an input spray manifold which extends longitudinally across the top of a first mixing means for even distribution of the supplied asphalt to all areas of the first mixing means.

A first embodiment of the granulated rubber input system is designed to handle the bags of granulated rubber, and includes an input hopper located at the lower end of an upwardly inclined variable speed conveyor. The conveyor delivers the granulated rubber to an accumulation hopper which feeds the rubber to a positive displacement feeding means that delivers the rubber at a constant rate into the top of the first mixing means. A magnetic separator is interposed between the feeding means and the first mixing means to remove metal fragments from the granulated rubber.

A second embodiment of the granulated rubber input means is designed for supplying the rubber from a bulk source, such as a tank car, to the first mixing means, and includes a materials feeding centrifugal blower which directs the materials from the supply to a cyclone. The output of the cyclone has a magnetic separator for the above described purpose, and the rubber passes therethrough into an input hopper located at the bottom of an upwardly inclined variable speed conveyor. The rubber delivered to the upper end of the conveyor is deposited into an accumulation hopper which is provided with a positive displacement feeding means as described above. Alternately, the rubber from the conveyor may be delivered to an endless electronic conveyor scale which senses the weight and the speed of the rubber being delivered into the first mixing means and is adapted to appropriately adjust the speed of the endless electronic conveyor scale and the speed of the variable speed conveyor to arrive at and maintain the desired constant feed rate of the rubber.

The first mixing means of the two-stage mixing system, which is optionally equipped with a heating means, includes a tank having a pair of rotatably driven augers which extend across the bottom of the tank. A float mechanism is provided in the tank which maintains the materials therein at a predetermined level and does so by controlling the operation of a variable speed positive displacement asphalt output pump located in the output conduit leading from the bottom of the first mixing means. The materials moving through the output conduit are passed under pressure through a second mixing means in the form of a motionless mixer which is the second stage of the two stage mixing system. The motionless mixer completes mixing of the asphalt and rubber materials to produce a completely and consistently blended product which is delivered from the output end of the motionless mixer to a point of use.

Accordingly, it is an object of the present invention to provide a new and improved apparatus and method for mixing molten asphalt and granulated rubber.

Another object of the present invention is to provide a new and improved apparatus for mixing molten asphalt and granulated rubber which may include means for removing contaminants from the asphalt and rubber materials.

Another object of the present invention is to provide a new and improved apparatus for mixing molten asphalt and granulated rubber which includes means for controlling the input feed rate and the amount of molten asphalt delivered thereto.

Another object of the present invention is to provide a new and improved apparatus for mixing molten asphalt and granulated rubber which includes means for controlling the input feed rate and the amount of granulated rubber delivered thereto.

Another object of the present invention is to provide a new and improved apparatus for mixing molten asphalt and granulated rubber which includes a granulated rubber input system that is configured to receive and handle rubber that is manually supplied thereto from pre-weighed bags.

Another object of the present invention is to provide a new and improved apparatus for mixing molten asphalt and granulated rubber which includes a granulated rubber input system that may be configured to receive and handle rubber from a bulk supply thereof.

Another object of the present invention is to provide a new and improved apparatus of the above described character which includes a two-stage mixing means for mixing and blending the molten asphalt and granulated rubber to produce a completely and consistently blended composition.

Still another object of the present invention is to provide a new and improved apparatus of the above described character in which the two-stage mixing system includes a mixing tank and a motionless mixer.

The foregoing and other objects of the present invention, as well as the invention itself, may be more fully understood from the following description when read in conjunction with the accompanying drawings.

BRIEF DESCRIPTION OF THE DRAWINGS

FIG. 4 is an end view of the first mixing means of the apparatus of the present invention with portions broken away to show the various features thereof.

FIG. 9 is a diagrammatic view of the second embodiment of the apparatus of the present invention showing the various systems thereof in schematic form.

FIG. 10 is a diagrammatic illustration showing a modification of the asphalt input system of the apparatus of the present invention.

FIG. 11 is an enlarged sectional view taken on the line 11—11 of FIG. 10.

DESCRIPTION OF THE PREFERRED EMBODIMENTS

Figure 1:
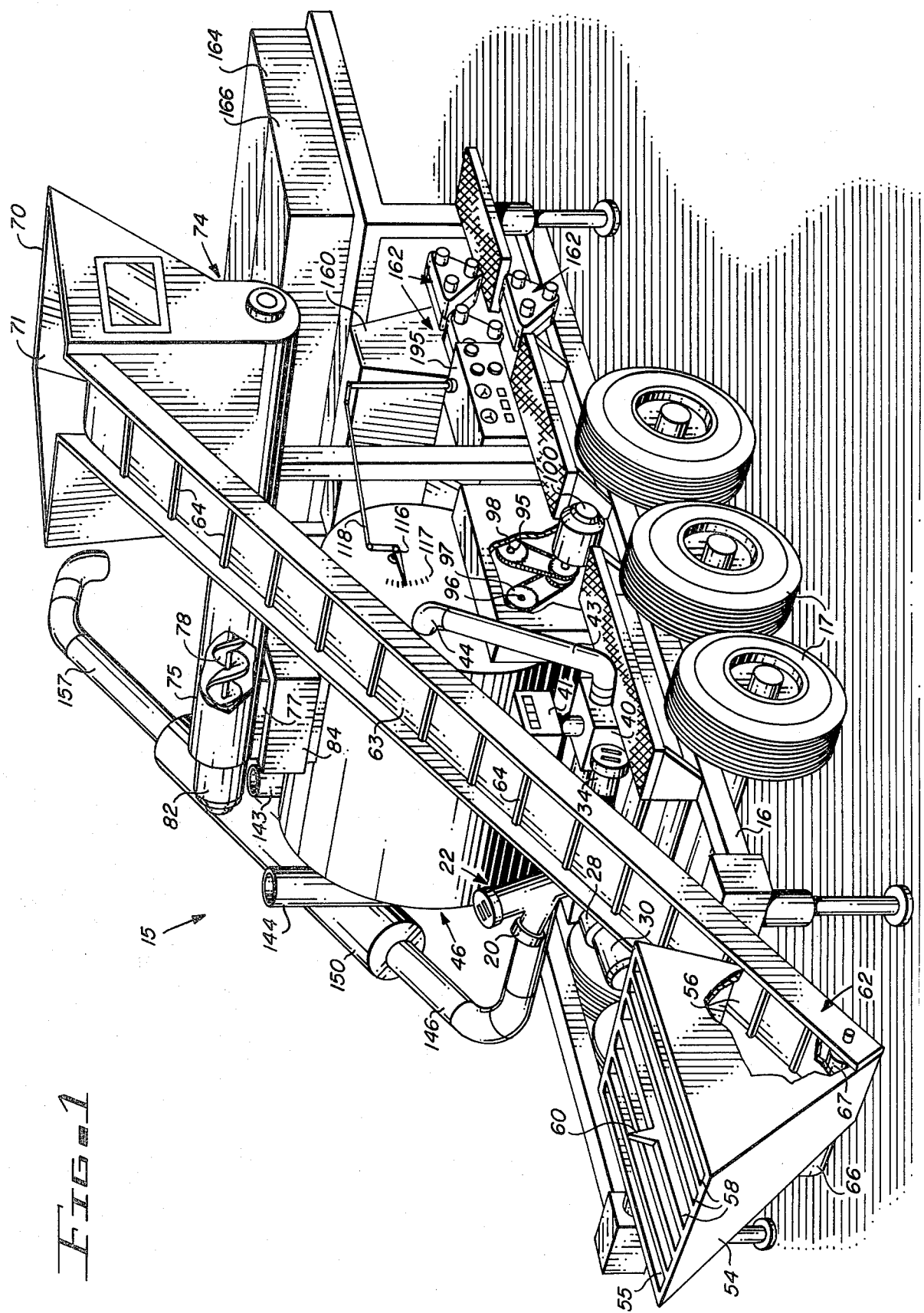
FIG. 1 is a perspective view of a first embodiment of the asphalt-rubber mixing apparatus of the present invention illustrating the various features thereof.

Referring more particularly to the drawings, FIG. 1 shows a first embodiment of the asphalt-rubber mixing apparatus of the present invention, with the apparatus being indicated in its entirety by the reference numeral 15.

The apparatus 15 is shown as being supported on a suitable frame 16 which is preferably in the form of a trailer device having the usual wheels 17. It is to be understood that the trailer configuration shown is not to be construed as a limitation of the present invention in that the frame 16 could be suitably configured for a fixed installation, or could be a self-propelled automotive vehicle as dictated by the intended usage.

In any event, the apparatus 15 includes various systems and subsystems which cooperate in the mixing of an aspalt-rubber compound, and as will hereinafter be described in detail, the main systems include an asphalt input system, a granulated rubber input system, a two-stage mixing system, and a control system.

Figure 2:
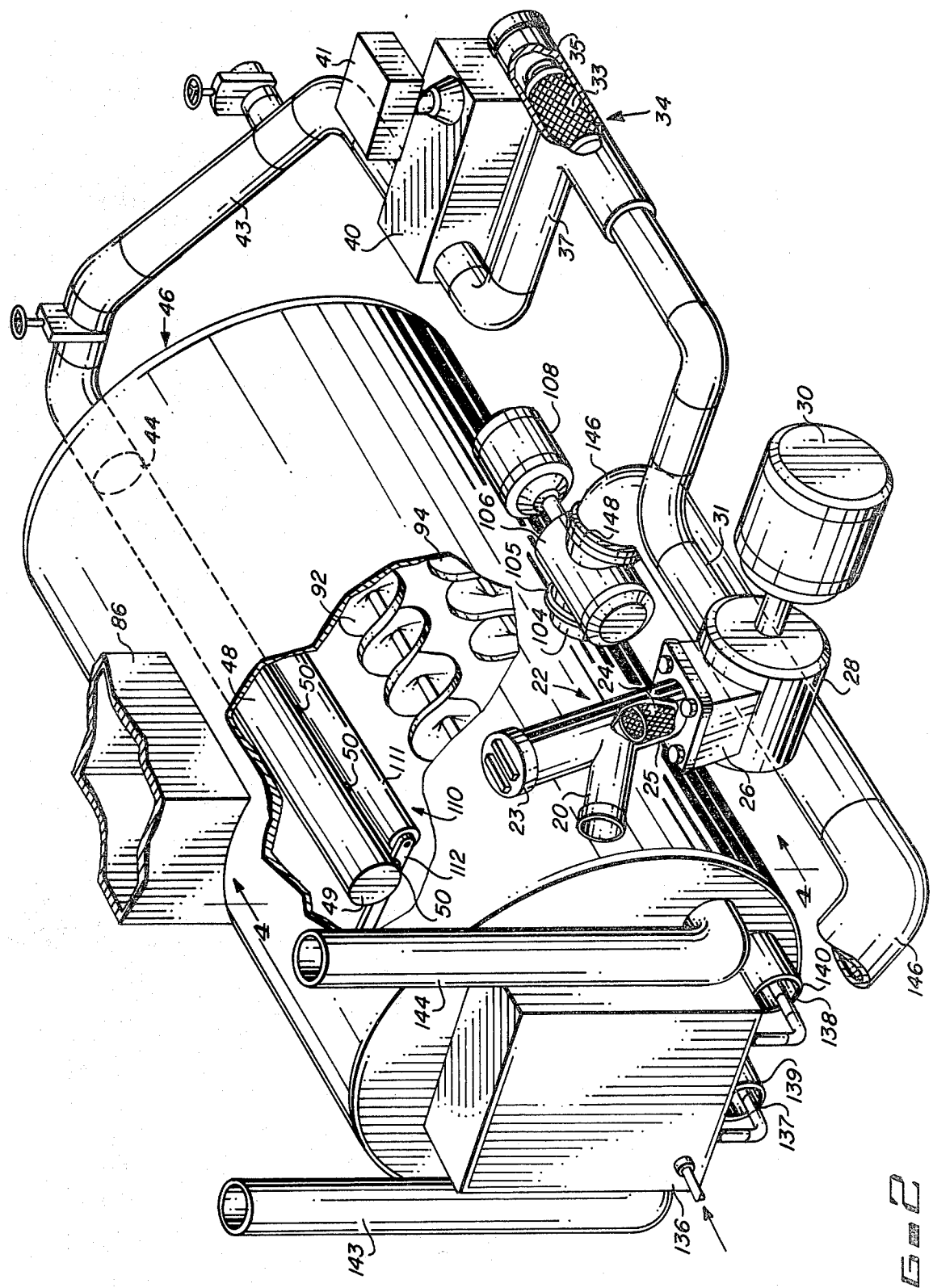
FIG. 2 is a fragmentary perspective view of the asphalt input system and the first mixing means of the apparatus of the present invention with portions thereof broken away to show the various features.

As best seen in FIG. 2, the asphalt input system includes an asphalt input pipe 20 for receiving molten asphalt from a remote heating mechanism (not shown). The asphalt input pipe 20 is one branch of a Y-shaped conduit 22 the other branch of which is closed with a removable cover 23 which provides access to a first strainer means in the form of a relatively large mesh strainer basket 24 which is removably mounted in the trunk 25 of the conduit 22. The conduit 22 is suitably mounted on the inlet port 26 of a positive displacement asphalt input pump 28 which is driven by a variable speed motor 30. The output from the pump 28 is coupled by means of a conduit 31 to a second comparatively fine mesh strainer means 33 which is removably carried in a T-shaped conduit 34 that has a capped branch 35 which allows the strainer basket 33 to be removed and replaced for cleaning purposes. The other branch 37 of the T-shaped conduit 34 is coupled to the inlet of an asphalt flow sensing means 40 which is in the form of a flow meter having an indicator device 41 which displays the gallons per minute of the asphalt flowing therethrough. The flow meter and display device are well known commercially available mechanisms such as that available from the Liquid Controls Corporation of North Chicago, Ill., and identified as model number M-15-H. The output from the flow meter 40 is supplied through a conduit 43 to the asphalt inlet port 44 of a first mixing means 46 which forms the first stage of the two-stage mixing system of the present invention. The molten asphalt input system further includes a spray manifold 48 which is mounted in the upper portion of the first, or premixing, means 46 so as to extend substantially the full length thereof. The manifold is connected on its inlet end to the inlet port 44 of the first mixing means 46 and has its other end closed as at 49. The manifold 48 is provided with a plurality of spray nozzles 50 that are spacedly arranged along the length thereof.

From the above, it will be seen that the molten asphalt input system includes means for removing contaminants from the supplied asphalt in the form of the first and second strainer means 24 and 33, respectively, means for indicating the asphalt flow rate in the form of the flow sensing means 40 and indicator 41, means for adjustably varying the asphalt flow rate in the form of the variable speed motor 30, and means for dispensing the asphalt evenly across the top of the first, or premixing means 46 in the form of the spray manifold 48.

Figure 3:
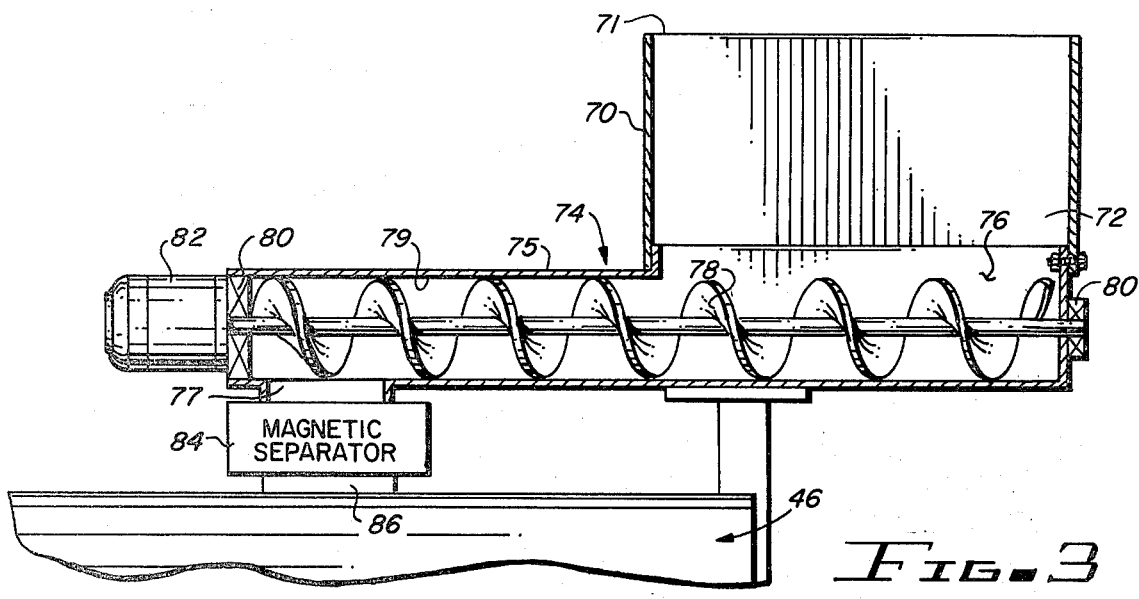
FIG. 3 is a fragmentary elevational view of the positive displacement rubber feeding means which forms part of the granulated rubber input system of the present invention, with portions broken away to show the various features thereof.

The granulated rubber input system, as best seen in FIGS. 1 and 3, includes an input hopper 54 having a relatively large input opening 55 at the upper end thereof with a pair of opposed converging sidewalls which terminate at a relatively small outlet opening 56 located at the bottom of the hopper. The input hopper 54 has a plurality of bars 58 spacedly arranged in the inlet opening 55 thereof which form a grate that is designed to allow the granulated rubber to freely fall into the hopper and to catch fragments of the bags (not shown) in which the rubber is supplied. An upstanding wedge-shaped spike 60 is provided on one of the bars 58 by which the bags of granulated rubber may be torn open so that the contents of the bags will empty into the hopper. The input hopper 54 is suitably supported on the lowermost end of an angularly upwardly extending conveyor 62 which includes the usual endless conveyor belt 63 having spacedly arranged transverse ribs 64 thereon. The conveyor belt is driven by a variable speed motor 66 which is connected to drive the belt moving roller 67 located at the lowermost end of the conveyor.

The upper end of the conveyor 62 is connected to an accumulation hopper 70 so that the granulated rubber transported by the conveyor 62 will be deposited into the open input opening 71 of the hopper 70. The purpose of the accumulation hopper 70 is to maintain a stockpile of the granulated rubber during operation of the apparatus 15 so that the operation of the rubber feeding means, which will hereinafter be described in detail, will not be interrupted or otherwise effected by any deviations in the rate at which the bags of rubber are emptied into the input hopper 54. The accumulation hopper 70 is a downwardly converging structure having a relatively small outlet opening 72, and the hopper is supported atop the rubber feeding means 74.

The rubber feeding means 74 includes a horizontally disposed cylindrical housing 75 having an upwardly opening radially extending inlet port 76 formed at one end thereof, with that port being in communication with the outlet opening 72 of the accumulation hopper 70 and a downwardly opening radially extending outlet port 77 at its opposite end. An auger 78 is axially disposed in the bore 79 of the cylindrical housing 75 and is rotatably journaled on its opposite ends in suitable bearing means 80. The auger 78 is sized to be a close tolerance fit in the bore 79 of the housing so as to be a positive displacement feeding mechanism, and the auger is driven by a variable speed motor 82 which is mounted on one end of the housing 75 and is suitably coupled to the shaft of the auger.

The radial outlet port 77 of the positive displacement rubber feeding means 74 is coupled to the inlet of a suitable electromagnetic separator means 84 which is intended to remove ferromagnetic particles which may be in the granulated rubber. Electromagnetic separators of the type suitable for this purpose are well known in the art and a detailed discussion thereof is not felt to be necessary. A suitable electromagnetic separator is available from the S. G. Frantz Company, Inc., P.O. Box 1138, Trenton, N.J. 08606, and is identified as Model No. 68V-HP.

From the above discussion, it will be seen that the granulated rubber input system includes means for receiving the rubber in the form of the input hopper 54, means for transporting the rubber at a variable speed in the form of the conveyor 62 with its variable speed drive motor 66, means for stockpiling the rubber in the form of the accumulation hopper 70, means for delivering the rubber at a controllable constant feed rate to the first mixing means 46 in the form of the positive displacement rubber feeding means 74 with its variable speed drive motor 82, and means for removing ferromagnetic contaminants from the granulated rubber in the form of the separator means 84.

As hereinbefore mentioned, a first, or pre-mixing means 46 is the first stage of the two-stage mixing system of the present invention, and receives molten asphalt from the spray manifold 48 in variably controllable amounts from the hereinbefore described asphalt input system, and receives rubber in a variably controllable constant feed rate through the rubber inlet port 86 thereof from the separator means 84 of the hereinbefore described granulated rubber input system, and accomplishes a preliminary mixing of the received materials to produce the asphalt-rubber composition 88.

As seen in FIGS. 1, 2, 4 and 5, the first, or pre-mixing, means 46 includes an elongated horizontally disposed tank 90 having the hereinbefore described asphalt inlet port 44, spray manifold 48, and rubber inlet port 86 located in the upper portion thereof. Agitation means in the preferred form of a spaced apart pair of augers 92 and 94 are rotatably journaled in the bottom portion of the tank 90 and are disposed to extend the full length thereof. As seen in FIG. 1, the axial shafts 95 and 96 of the augers 92 and 94, respectively, extend through one end of the tank 90 and have sprockets 97 and 98 mounted fast thereon. The sprockets 97 and 98 are coupled by suitable chains to a variable speed drive motor 100.

The tank 90 has an asphalt-rubber composition outlet port 102 (FIG. 4) in the bottom thereof which is coupled by means of a conduit 104 to the inlet port 105 of a positive displacement asphalt output pump 106 which is driven by a variable speed motor 108, as seen best in FIG. 2.

Figure 5:
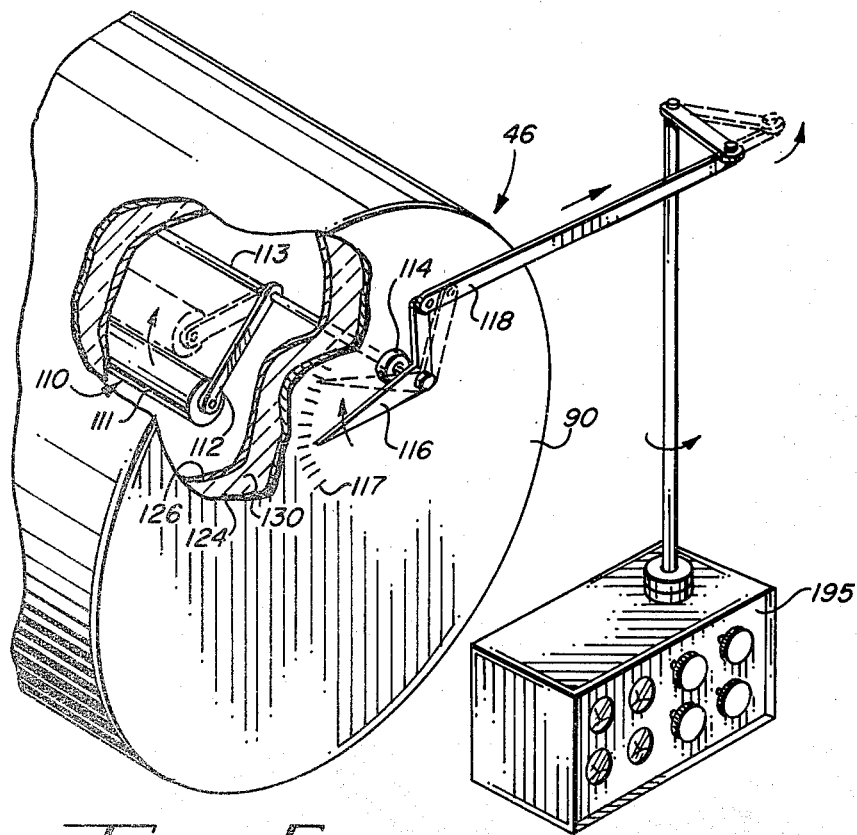
FIG. 5 is a fragmentary perspective view of the first mixing means with portions thereof broken away and illustrating a modification thereof.

The tank 90 has a materials level sensing means in the form of a float mechanism 110 mounted therein to automatically maintain the asphalt-rubber composition 88 at a predetermined level. The float mechanism 110 includes a float body 111 which has its opposite ends supported by a pair of swing arms 112, with the opposite ends of the arms 112 being attached to a shaft 113 which is journaled for rotation, as at 114, in the end walls of the tank 90. One end of the rotatable shaft 113 extends through the end wall of the tank 90 as shown in FIG. 5, and has a level indicator 116 mounted fast thereon, with the indicator being in the form of a pointer which, in conjunction with a suitable scale 117, provided on the exterior of the tank 90, provides a visual indication of the level of the asphalt-rubber composition 88 in the tank 90. The extending end of the shaft 113 also has a linkage assembly 118 connected thereto and the purpose of this linkage assembly will hereinafter be described in detail.

Although the asphalt-rubber mixing apparatus 15 of the present invention is primarily intended to operate with substantially constant input feed rates of the molten asphalt and the granulated rubber, and a substantially constant asphalt-rubber composition output rate, instances may occur where the asphalt-rubber composition must be held in the first mixing means 46 for undetermined periods of time. For example, when the asphalt-rubber composition is being mixed for supplying spreader vehicles (not shown), unusually long periods of time may occur between successive vehicles; in this and other situations, the molten state of the asphalt-rubber composition must be maintained to prevent cooling and the resulting solidification thereof. Therefore, the first mixing means 46 may include a heating means for maintaining the molten state of the asphalt-rubber composition 88 when needed.

To accommodate the above mentioned heater means, the tank 90 as seen best in FIGS. 2 and 4, is formed with a substantially cylindrical outer shell 124 with a cylindrical hot tank 126 mounted therein. A heating jacket 128 having a heating oil 129 or other heatable liquid, therein is positioned below the hot tank 126 in coextensive contiguous engagement with approximately one half of the curved peripheral surface thereof. The hot tank 126 and the heating jacket 128 have a suitable insulative blanket 130 wrapped therearound to retard heat loss. A heating oil drain line 131 depends from the bottom of the heating jacket 128 and extends exteriorly from the outer shell 124. A fill line 132 extends upwardly from the heating jacket and is capped with a dip stick assembly 133, and a vent line 134 similarly extends from the heating jacket.

A flammable gas supplied from a suitable source, either from tanks (not shown) mounted on the frame 16, or from a remote location, is supplied through a suitable control box 136, mounted on the first mixing means 46, to a pair of burners 137 and 138. The burners are disposed within different ones of a spaced pair of heater flues 139 and 140 which extend through the end wall of the outer shell 124 into the heating jacket 128. The flues 139 and 140 are formed into looped configurations as at 142, so as to return through the same end wall of the outer shell 124 and extend upwardly therefrom to provide exhaust stacks 143 and 144.

One end of a conduit 146 (FIG. 2) is connected to the outlet port 148 of the asphalt-rubber composition output pump 106, with the other end of the conduit 146 being connected to the inlet port of a second mixing means in the form of a static, or motionless mixer 150 (FIGS. 1 and 6) which is the second stage of the two-stage mixing system of the apparatus of the present invention.

Figure 6:
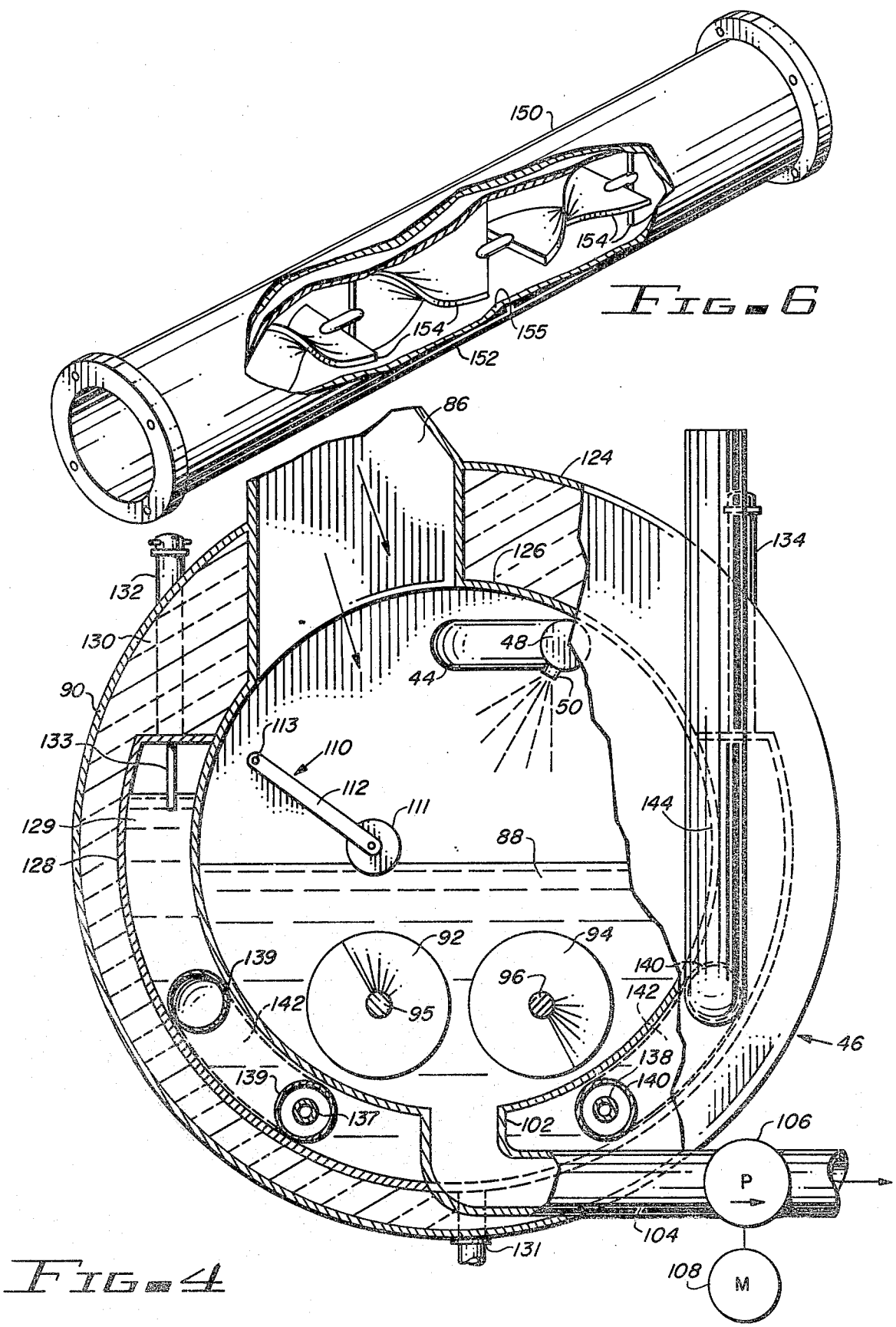
FIG. 6 is a perspective view of the second mixing means in the form of a motionless mixer which forms the second stage of the two-stage mixing system of the apparatus of the present invention, with portions of the motionless mixer broken away to illustrate the various features thereof.

As seen in FIG. 6, and as is well known in the art, the motionless mixer 150 includes a cylindrical housing 152 having a series of alternating right hand and left hand helical elements 154 fixedly mounted in the bore 155 thereof. The asphalt-rubber composition 88 pumped through the motionless mixer 150 is subjected to dividing and rotational forces due to the helical elements 154, with the degree of mixing being considerably greater than anything possible with an agitation type of mixing device such as the hereinbefore described first mixing means 46. A motionless mixer suitable for this purpose is available from The Luwa Corporation of P.O. Box 16348, Charlotte, N.C. 28216.

After passing through the motionless mixer 150, the thoroughly blended asphalt-rubber composition enters into a conduit 157 for delivery to a point of use.

Referring once again to FIG. 1 wherein an engine 160 is shown for driving a hydraulic pump assembly 162, which will hereinafter be described in detail. Also shown is a fuel tank 164 for operation of the engine 160, and a hydraulic oil reservoir tank 166.

Figure 7:
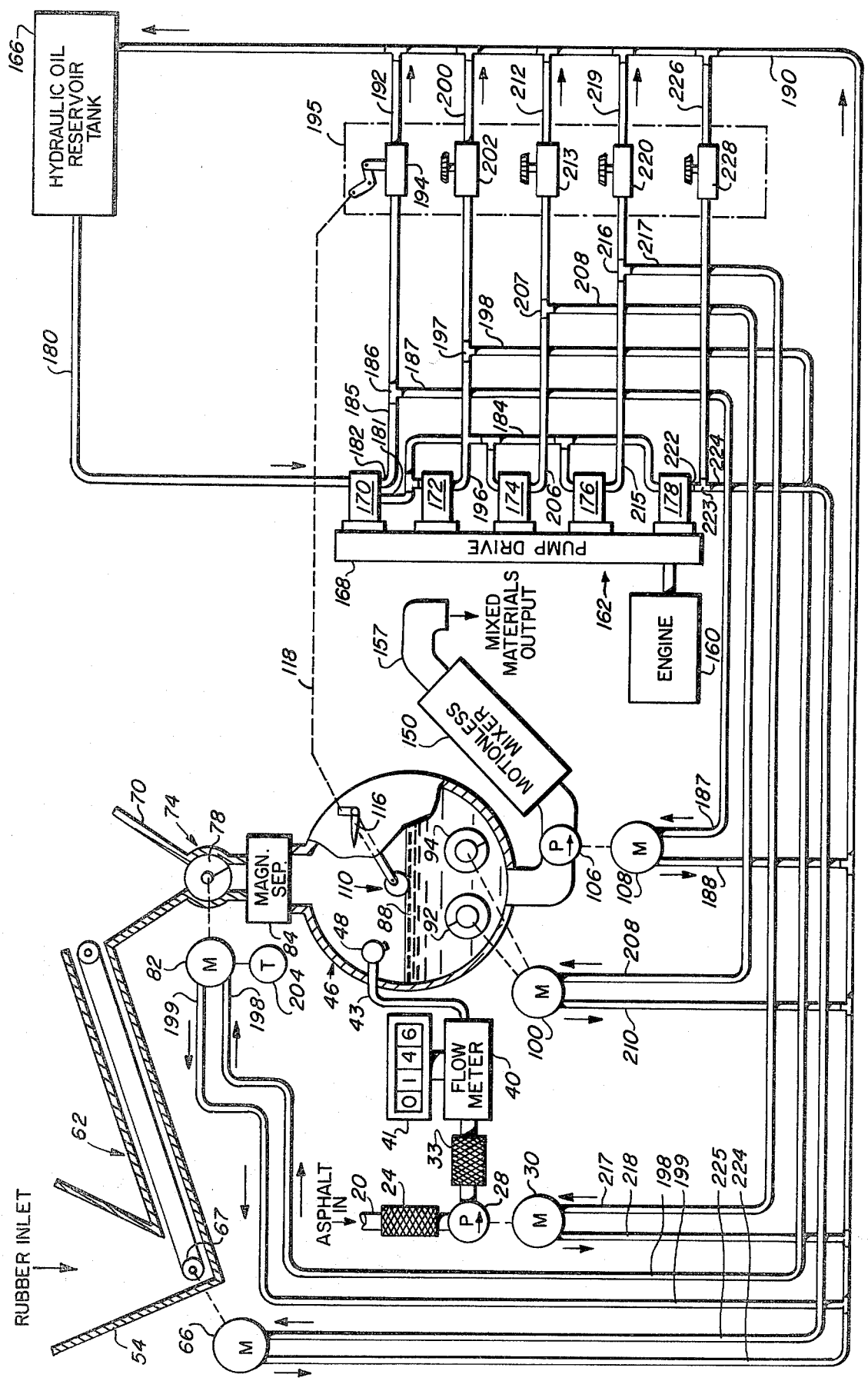
FIG. 7 is a diagrammatic illustration of the first embodiment of the apparatus of the present invention showing the various systems thereof in schematic form.

The control system of the apparatus 15 of the present invention, along with the operation of the apparatus itself will now be explained in detail with particular reference being made to FIG. 7.

The engine 160 is coupled to a suitable pump drive means 168 which drives a plurality of hydraulic pumps 170, 172, 174, 176 and 178, with those pumps operating the various systems and subsystems of the apparatus 15.

Hydraulic oil from the reservoir tank 166 is supplied through line 180 to the inlet of the hydraulic pump 170 which is a split pump in that the oil is simultaneously directed into two separate segments of the pump with each of those segments delivering a different outlet pressure to their respective outlet ports 181 and 182. The hydraulic oil from the outlet port 181 is directed into a supply manifold 184 which supplies that oil under pressure to the hydraulic pumps 172, 174, 176 and 178 as will hereinafter be described. The hydraulic oil from the outlet port 182 is directed by a line 185 to a tee 186 into a line 187 which is connected to the variable speed hydraulic motor 108 which drives the asphalt-rubber composition output pump 106, and this oil which drives the motor 108 is directed through a return line 188 to a suitable collection manifold 190 which returns the oil to the reservoir tank 166. A bypass line 192 is connected between the tee 186 and the collection manifold 190 with a flow control valve 194 in the bypass line 192. The flow control valve 194 is an adjustable mechanism which allows more or less oil under pressure to be fed directly into the collection manifold 190 and will thus cause more or less oil under pressure to be directed through the line 187 to the motor 108. Therefore, the speed of the motor 108 and thus the output pump 106 is variable in accordance with the adjustment of the flow control valve 194. As hereinbefore mentioned, the float mechanism 110 in the tank 90 of the first mixing means 46 has a linkage assembly 118 connected thereto. This linkage assembly 118 as shown in dashed lines in FIG. 7, is connected to the flow control valve 194, which may be housed in the control panel 195 as seen in FIGS. 1 and 5, and will adjust the valve in accordance with the level of the asphalt-rubber composition 88 in the first mixing means 46.

Hydraulic oil under pressure is supplied to the inlet port of the hydraulic pump 172 from the supply manifold 184 and passes through the pump 172 into a line 196 which is connected to a tee 197. A line 198 from the tee 197 supplies the hydraulic oil under pressure to the variable speed hydraulic motor 82 which drives the positive displacement rubber feeding means 74. After driving the motor 82, the hydraulic oil is directed through a return line 199 to the collection manifold 190 which in turn directs the oil back to the reservoir tank 166. A bypass line 200 is connected between the tee 197 and the collection manifold 190 and a flow control valve 202 is located in that bypass line. The flow control valve 202 is a manually adjustable device for allowing more or less oil under pressure to be fed directly into the collection manifold 190 and thus will cause more or less oil under pressure to be directed through the supply line 198 to the motor 82. Therefore, the speed of the motor 82, and thus the feed rate of the positive displacement rubber feeding means 74, is variable in accordance with the adjustment of the flow control valve 202. As shown in FIG. 7, the motor 82 is equipped with a suitable tachometer 204 which indicates the speed of the motor 82 and thus the RPM of the positive displacement feeding means 74. Therefore, an operator can adjust the RPM of the positive displacement feeding means 74 by manually adjusting the flow control valve 202.

Hydraulic oil from the supply manifold 184 passes through the pump 174 into a line 206 which is connected between that pump and a tee 207. Line 208 supplies the hydraulic oil under pressure from the tee 207 to the variable speed motor 100 which drives the mixing augers 92 and 94 that are mounted in the mixing tank 90. After driving the motor 100, the hydraulic oil is directed through a return line 210 to the collection manifold 190 and is thus returned to the reservoir tank 166. A bypass line 212 is connected between the tee 207 and the collection manifold 190 and a flow control valve 213 is located in that line. The flow control valve 213 is a manually adjustable device which allows more or less hydraulic oil to be fed directly into the collection manifold and thus allows more or less oil to be directed to the auger motor 100 for driving thereof in accordance with the adjustments made by an operator.

The supply manifold 184 also supplies hydraulic oil to the pump 176 which passes therethrough into a line 215 having a tee 216 therein. A line 217 supplies the hydraulic oil under pressure to the variable speed motor 30 which drives the molten asphalt input pump 28 of the asphalt input system. Oil from the motor 30 is directed through a return line 218 to the collection manifold 190 and is thus returned to the reservoir tank 166. A bypass line 219 is connected between the tee 216 and the collection manifold 190 and a flow control valve 220 is positioned in that line. The flow control valve 220 is a manually adjustable device for directing more or less hydraulic oil through the bypass line 219 and thus allowing more or less oil to be directed to the motor 30 for variable speed driving of the asphalt input pump 28 in accordance with adjustments made by an operator.

Hydraulic oil from the supply manifold 184 passes through the pump 178 into the line 222 which is connected between the pump and a tee 223. A line 224 supplies the hydraulic oil under pressure from the tee 223 to the variable speed motor 66 which drives the conveyor 62 of the granulated rubber input system. Oil from the motor 66 is directed through a return line 225 to the collection manifold 190 and is thus returned to the reservoir tank 166. A bypass line 226 is connected between the tee 223 and the collection manifold 190 and a flow control valve 228 is located in the bypass line 226. The flow control valve 228 is a manually adjustable mechanism for directing more or less hydraulic oil through the bypass line 226 and thus allowing more or less oil to be directed to the motor 66 for variable speed driving thereof in accordance with adjustments made by an operator.

It will be understood, particularly by those skilled in the hydraulic arts, that the above described control system is but one way that the desired control functions can be achieved. To illustrate this point, each of the previously described pumps 170, 172, 174, 176 and 178 and their respectively associated flow control valves 194, 202, 213, 220 and 228 could be replaced with a variable volume axial piston pump (not shown). As is well known, a variable volume axial piston pump is a device which includes a built-in control device commonly referred to as a swash plate, and by suitably positioning the swash plate the output volume of such a pump can be infinitely varied. This is simply a hardware modification in that the control system function and operation will remain the same.

Further hardware modifications can be made with the resulting control system being functionally unaffected. For example, the hydraulic control system hereinbefore disclosed could be completely electric, completely pneumatic, or could be hybrid combinations thereof.

Modification of the basic control system function and operation are also possible without effecting the over all operation of the apparatus 15. In the above described control system, both the asphalt input system and the granulated rubber input system are fully and independently adjustable. Since the granulated rubber feeding means 74 is a positive displacement feeding device, due to the close tolerance fit of the auger 78 in the housing 75, it will deliver a given amount of rubber for each revolution of the auger. Thus, fixed nonadjustable driving of the rubber feeding means 74 at a predetermined RPM will deliver a fixed constant quantity of the rubber in a given length of time, and the asphalt input system can be appropriately adjusted to deliver the proper amount of asphalt to match the known amount of rubber, and thus arrive at the desired mixture proportions.

Figure 8:
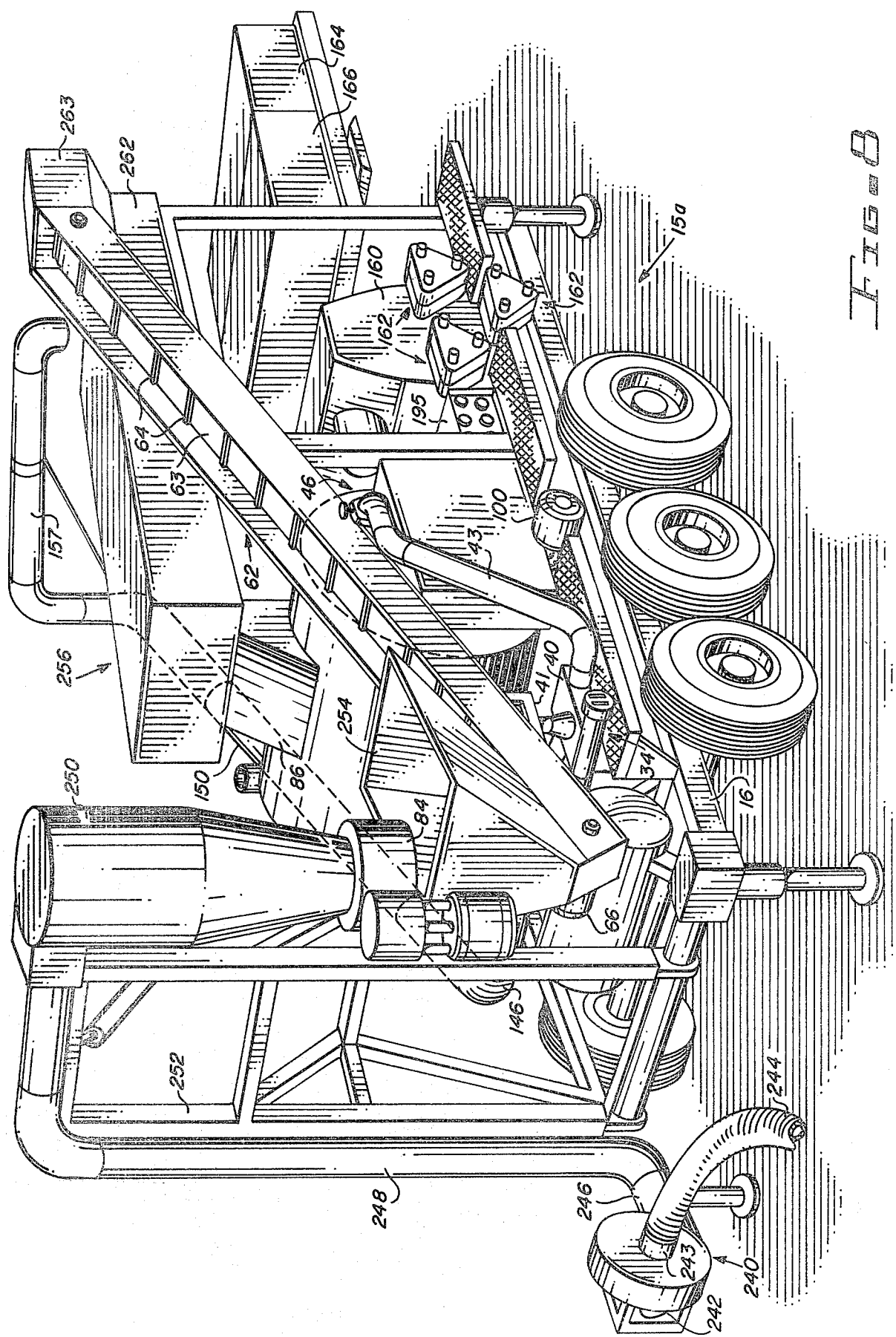
FIG. 8 is a perspective view of a second embodiment of the apparatus of the present invention.

Referring now in particular to FIGS. 8 and 9 wherein a second embodiment of the asphalt-rubber mixing apparatus of the present invention is shown and is indicated generally by the reference numeral 15a. As will be seen as this description progresses, some of the systems and subsystems of the apparatus 15a are identical to those of the hereinbefore described apparatus 15, and in such instances those systems and subsystems will be identified by the previously mentioned reference numerals are the detailed descriptions thereof will not be repeated.

The asphalt-rubber mixing apparatus 15a is provided with a granulated rubber input system that is designed to extract and otherwise handle the rubber from a bulk supply of such material, as for example, from a tank car (not shown) or any other bulk material transport and/or storage apparatus.

Therefore, the granulated rubber input system of the apparatus 15a includes a materials feeding blower means 240 which is driven by a variable speed motor 242. The axial inlet port 243 of the blower means 240 has a suction line, or hose, 244 connected thereto with the suction line being intended to reach into the previously mentioned bulk granulated rubber supply (not shown) and extract the rubber therefrom due to the negative static pressure created by operation of the blower means. The granulated rubber is fed by the blower means 240 under pressure through its outlet port 246 into a conduit 248 to the top of a suitable cyclone 250 which is supported by a superstructure 252 mounted on the frame 16. The cyclone 250 separates the air from the granulated rubber passing therethrough in accordance with the well known operating principles of cyclones and the granulated rubber will pass through the electromagnetic separator means 84 which separates ferromagnetic particles from the rubber in the manner hereinbefore described.

The granulated rubber falling from the cyclone 250 and the separator means 84 enters into an accumulation hopper 254 which contains a predetermined amount of the granulated rubber at all times during operation of the apparatus 15a to insure an interrupted and steady feeding of the rubber as will become apparent as this description progresses.

The accumulation hopper 254 is supportingly carried on the lowermost end of the conveyor 62 which, as hereinbefore described, is driven by the variable speed motor 66. The conveyor 62 may transport the granulated rubber to the positive displacement rubber feeding means 74 (FIGS. 1 and 3) as previously described, or alternately to a weigh feeder system which is indicated generally by the reference numeral 256.

As shown schematically in FIG. 9, the weigh feeder system 256 is provided with an endless continuously operating belt 258 which is driven by a variable speed electric motor 260. The granulated rubber drops onto one end of the belt 258 through an inlet port 261 of the weigh feeder system housing 262, with the inlet port 261 being coupled by a suitable duct 263 to the outlet end of the conveyor 62. The granulated rubber is transported by the continuous belt 258 to the outlet port 264 of the housing 262 which is connected to the rubber inlet port 86 of the first mixing means 46. The weigh feeder system 256 is provided with a speed sensor device 266 which senses the operating speed of the belt 258 and generates an electric signal indicative of that speed. Also, the weigh feeder system is equipped with a weight sensing device 268 which senses the weight of the materials being transported and produces an electric signal indicative of that weight. The electric signals indicative of the belt speed and the material weight are coupled by suitable conductors 269 and 270, respectively, to a controller 272 which compares those signals to adjustably preset conditions and produces a corrective signal if the input signals deviate from the preset conditions. The corrective signal is coupled by a conductor 274 to the variable speed electric motor 260 which drives the endless belt 258, to vary the driven speed of the belt. That same corrective signal is employed to vary the speed of the motor 66 which drives the conveyor 62 as will hereinafter be described in detail.

The weigh feeder system 256 is only described briefly above in that such systems are well known in the art. A system suitable for this purpose is available from Auto-Weigh Inc. of 1439 No. Emerald Ave., Modesto, Calif. 95352, and is identified as Series E-300 Standard Duty Continuous Belt Scale.

The granulated rubber is deposited in the first mixing means 46 as described above, and the molten asphalt is supplied thereto by the hereinbefore described molten asphalt system as shown best in FIG. 2. The rubber and the molten asphalt are premixed in the tank 90 and are extracted therefrom by the asphalt output pump 106, are passed through the motionless mixer 150 into the conduit 157 for delivery to a point of use.

The control system and operation of the asphalt-rubber mixing apparatus 15a are essentially the same as that previously described in reference to the apparatus 15, although some control differences do exist, and those differences will now be discussed.

As before, the engine 160 drives a plurality of hydraulic pumps, with the pump 170 providing hydraulic oil under pressure through the supply manifold 184 to the other pumps, and in conjunction with the flow control valve 194 and associated oil flow lines, drives the asphalt-rubber output pump 106. The hydraulic pump 174 in conjunction with the manually adjustable flow control valve 213 and the associated oil flow lines drives the auger motor 100. The pump 176 in conjunction with the flow control valve 220 and associated flow lines drives the motor 30 which in turn drives the asphalt input pump 28.

A first difference between the instant control system and that previously described, includes a hydraulic pump 280 which receives hydraulic oil from the supply manifold 184 with that oil passing through the pump 280 into a line 281 which is connected between the pump and a tee 282. A line 283 supplies the hydraulic oil under pressure from the tee 282 to the variable speed motor 242 which drives the materials feeding blower means 240. Oil from the motor 242 is directed through a return line 284 to the collection manifold 190 and is returned thereby to the reservoir tank 166. A bypass line 286 is connected between the tee 282 and the collection manifold 190 and a manually adjustable flow control valve 288 is positioned in the bypass line 286. The flow control valve 288 is a manually adjustable device for directing more or less oil through the bypass line 286, and thus allows more or less oil to be directed to the motor 242 for variable speed driving thereof.

Another difference in the instant control system includes a hydraulic oil pump 290 through which oil from the supply manifold 184 passes into a line 291 that is connected between the pump 290 and a tee 292. A line 294 supplies the hydraulic oil under pressure from the tee 292 to the variable speed motor 66 which drives the conveyor 62. Oil from the motor 66 is directed through a return line 295 to the collection manifold 190 and is returned thereby to the reservoir tank 166. A bypass line 296 is connected between the tee 292 and the collection manifold and an adjustable flow control valve 298 is disposed in the bypass line 296. The flow control valve 298 is an electrically adjustable device for allowing more or less oil to pass directly from the pump 290 into the collection manifold 190, and thus allows more or less oil to be directed to the motor 66 for variable speed driving thereof. As hereinbefore mentioned, the controller 272 of the weigh feeder system 256 produces a correction signal when the speed of the continuous belt 258 and/or the weight of the transported rubber deviates from the adjustable preset conditions. In addition to that corrective signal being coupled to the electric motor 260 which drives the continuous belt 258, it is coupled through a suitable conductor 300 to the control device 302 of the electrically adjustable flow control valve 298. In this manner, if the weigh feeder system 256 senses a deficiency in its delivery rate of the granulated rubber, the corrective signal will appropriately position the flow control valve 298 to cause an increase in the speed of the motor 66 which in turn causes the conveyor to speed up and thereby deliver more granulated rubber to the weigh feeder system 256. In a similar manner, the conveyor 62 will be slowed down to deliver less rubber in the case where the weigh feeder system 256 senses that it is delivering the rubber at an excessive rate.

It will be understood that the above control system described in regard to the apparatus 15a is only exemplary of a control system that can be used in conjunction therewith. Other systems, such as electric or pneumatic systems can be used, variable volume axial piston pumps can be used in place of the pumps and flow control valves disclosed, and combination systems can be employed. To give but one example of a combination control system, the hydraulic motor 66 which drives the conveyor 62 in the apparatus 15a could easily be replaced with a variable speed electric motor (not shown) so that the corrective signal from the controller 272 could be employed to directly adjust the speed of such a motor.

As is well known in the art, molten asphalt is a very difficult material to handle, and is particularly troublesome with regard to the use of flow meters such as that hereinbefore described. In view of this problem, an alternate method of measuring and indicating the flow of molten asphalt in the apparatus 15 or 15a has been devised.

As seen in FIGS. 10 and 11, the above mentioned alternate asphalt input system includes the asphalt input pipe 20 which is one branch of the Y-shaped conduit 22 with the other branch containing the strainer basket 24 (FIG. 2), and having the trunk 25 mounted on the asphalt input pump 28 in the manner hereinbefore described. The variable speed motor 30 is employed to drive the pump 28 and therefore the output shaft 310 of the motor 30 is coupled to the drive shaft 312 of the pump 28 with a suitable coupling device 314. An RPM sensing means such as the power take off device 316 is mounted on the output shaft 310 of the motor 30, with the power take off device being shown as a chain sprocket mechanism. The RPM sensing means 316 is employed to drive a cable 318 which extends therefrom to a counter means 320. The counter means 320 includes a suitable gear drive mechanism 322 which is coupled through a decoupling means in the form of an electrically operated clutch 324 to the counter and display apparatus 326.

The asphalt input pump 28 is a positive displacement mechanism, thus a fixed and known amount of asphalt will pass therethrough for each revolution of the pump. By employing a proper gear ratio in the gear drive mechanism 320, the counter and display mechanism 326 will record and indicate the gallons per minute delivered by the pump 28.

The molten asphalt exits the pump 28 through the conduit 31 and passes through the strainer means 33 (FIG. 2) which is carried in the tee shaped conduit 34. The branch 37 of the conduit 34 is connected to the inlet of an asphalt flow sensor means 320, the outlet of which is coupled by the conduit 42 to the first mixing means 46.

The asphalt flow sensor means 330 includes a cylindrical housing 332 having a flapper valve 334 mounted therein. The flapper valve is mounted fast for rotation with a shaft 335 which has one of its ends 336 extending exteriorly of the housing 332. A suitable coil spring 338 is wound around the extending end 336 of the shaft 335 and is connected to both the shaft and the housing to yieldably bias the flapper valve 334 to the closed position. When molten asphalt is flowing in the conduits which connect the pump 28 to the first mixing means 46, the flapper valve 334 will be forced to the open position and will remain in that position as long as the flow of asphalt continues. When the flow of asphalt is interrupted, the pump 29 will pump air, and the flow of air is insufficient to hold the flapper valve in its fully open position, and it will move under the influence of the spring 338 toward its normally closed position.

A cam 340 is mounted fast on the extending end 336 of the shaft 335, and a suitable cam follower 342 is mounted for engagement with the cam surface. The cam follower is coupled to a suitable switch 344 that is carried on a bracket 346 which is mounted on the housing 332. When the flapper valve is in the open position, indicative of asphalt flow, the switch 344 is positioned to complete the electric circuit to the electrically operated clutch 324 and thus holds it in a first state which enables the operation of the counter and display apparatus 326. Likewise, when the flapper valve is in its normally closed position, indicative of a no asphalt flow condition, the switch 334 is positioned to interrupt or open the electric circuit to the clutch 324 thus actuating it to its second state whereby the counter and display apparatus 326 are held inoperative.

With the apparatus of the present invention equipped with the alternate asphalt input system described above, the switch 334 may also be connected to an electric motor 348 which drives the positive displacement rubber feeding means 74. Thus, when a no asphalt flow condition occurs, feeding of the rubber will automatically be interrupted.

While the principles of the invention have now been made clear in illustrated embodiments, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A method for mixing molten asphalt and granulated rubber comprising the steps of:
   (a) supplying molten asphalt to a mixing means at a variably controllable flow rate;
   (b) supplying granulated rubber to said mixing means at a known constant feed rate;
   (c) mixing the supplied molten asphalt and the supplied granulated rubber in said mixing means to produce a premixed asphalt-rubber composition;
   (d) extracting the premixed asphalt-rubber composition from said mixing means at a variably controllable flow rate;
   (e) directing the extracted premixed asphalt-rubber composition under pressure through an in-line motionless mixer for producing a thoroughly blended asphalt-rubber composition; and
   (f) delivering the thoroughly blended asphalt-rubber composition from said in-line motionless mixer to a point of use.

2. The method of claim 1 wherein the step of supplying the granulated rubber to said mixing means is accomplished at a fixed constant feed rate.

3. The method of claim 1 wherein the step of supplying the granulated rubber to said mixing means is accomplished at a variably controllable constant feed rate.

4. The method of claim 1 wherein the step of supplying the granulated rubber to said mixing means includes the steps of:
   (a) operating a materials feeding blower means to produce a negative static pressure therein;
   (b) coupling the negative static pressure produced by said materials feeding blower means to a bulk supply of the granulated rubber to draw the granulated rubber to said materials feeding blower means;
   (c) delivering the granulated rubber under pressure from said materials feeding blower means to a cyclone; and
   (d) delivering the granulated rubber from said cyclone to a rubber feeding means for supplying the granulated rubber to said mixing means at the known constant feed rate.

* * * * *